(Specimens.)

B. W. CONNELLY.
FIRE KINDLER.

No. 308,140. Patented Nov. 18, 1884.

Witnesses,
Geo. H. Strong
J. H. Towns

Inventor,
B. W. Connelly
By
Dewey & Co.
Attorneys

United States Patent Office.

BARNEY W. CONNELLY, OF SAN FRANCISCO, CAL., ASSIGNOR TO DANIEL R. McNEILL AND BURTON B. PORTER, BOTH OF SAME PLACE.

FIRE-KINDLER.

SPECIFICATION forming part of Letters Patent No. 308,140, dated November 18, 1884.

Application filed January 7, 1884. (Specimens.)

*To all whom it may concern:*

Be it known that I, BARNEY W. CONNELLY, of the city and county of San Francisco, and State of California, have invented an Improvement in Fire-Kindlers; and I hereby declare the following to be a full, clear, and exact description thereof.

My invention relates to a new and useful fire-kindler; and it consists of sawdust as a base, previously prepared with a solution of saltpeter and alum, and subsequently mixed with resin, tallow, and tar, in the manner I shall hereinafter fully describe, and molded in a peculiar shape to prevent smothering in use.

The object of my invention is to provide a fire-kindler in which the natural inflammableness of the resin, tallow, and tar is held in check to a certain extent by the chemically-prepared sawdust, whereby rapid combustion is retarded, while a high degree of heat is engendered, and by the peculiar shape into which the composition is molded to provide for ventilation to prevent it from being smothered by carelessly placing the fuel upon it.

Figure 1:
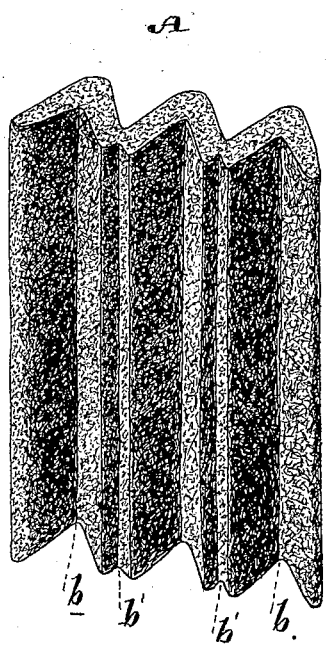
Figure 2:
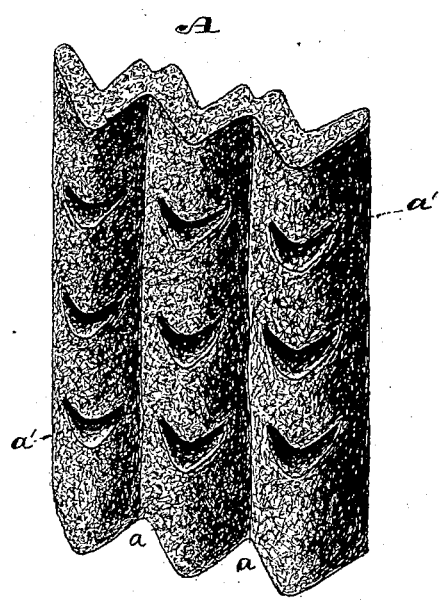

Referring to the accompanying drawings, Figure 1 represents a block of my fire-kindler molded and raised on edge to show the under side. Fig. 2 is a view of same, showing the upper side.

I first prepare an aqueous solution of saltpeter and alum, using two (2) ounces of the former, one (1) ounce of the latter, and one (1) gallon of water. Of this solution I use sixteen (16) ounces to four (4) pounds of sawdust. I mix them and kiln-dry the same. I then take six (6) pounds of melted resin, twelve (12) ounces of tallow, and one (1) pound of tar, and melt and mix them together. To this mixture, while still melted and heated, I add four (4) pounds of the previously-prepared kiln-dried mixture of the aqueous solution of saltpeter and alum and the sawdust, said mixture being kept at the same degree of heat as the tar, tallow, and resin mixture. After mixing the whole well I subject it to a pressure of two hundred pounds, or more, to the square inch. This makes a clean solid compound, which will keep in any climate, and from which there is no dripping while burning. It is free from spontaneous combustion or danger in any manner whatever. The shape shown in the drawings I deem essential for the purpose of preventing smothering. This shape is obtained by subjecting it to the pressure above referred to in V-shaped molds suitable for the purpose.

A is the block of fire-kindler, having deep grooves *a* one way and shallow cuts *a'* transversely on top, and deep grooves *b* and intervening shallow ones *b'* on the bottom.

In building the fire one is apt to lay the fuel carelessly upon the kindler, and if it were a flat piece it might be completely smothered; but by being corrugated or grooved, as shown, a free draft or ventilation is provided, and the kindler will not be smothered.

Having thus described my invention, what I claim as new, and desire to secure by Letters Patent, is—

1. The process herein described for producing fire-kindlers, which consists in first treating sawdust with an aqueous solution of saltpeter and alum, and then kiln-drying, and subsequently mixing the mass while heated with a melted mixture of resin, tallow, and tar in substantially the proportions specified, and finally subjecting the whole composition to pressure to solidify it, substantially as set forth.

2. An improved fire-kindler, consisting of sawdust previously treated with an aqueous solution of saltpeter and alum and kiln-dried, and subsequently mixed while heated with a melted mixture of resin, tallow, and tar, the ingredients being used substantially in the proportions specified, the whole composition being subjected to pressure in a matrix to mold it with suitable longitudinal and transverse grooves to provide for proper draft or ventilation, substantially as herein described.

3. An improved fire-kindler, A, consisting of inflammable ingredients or substances, as described, and molded with top grooves, *a a'*, and bottom grooves, *b b'*, substantially as and for the purpose herein described.

In witness whereof I have hereunto set my hand.

BARNEY W. CONNELLY.

Witnesses:
C. D. COLE,
J. H. BLOOD.